(12) United States Patent
Achenbach et al.

(10) Patent No.: US 6,323,262 B1
(45) Date of Patent: Nov. 27, 2001

(54) PROCESS FOR THE CONTINUOUS PRODUCTION OF HIGHLY VISCOUS FILLER-CONTAINING SILICONE COMPOSITIONS

(75) Inventors: Frank Achenbach, Simbach; Manfred Heisler; Armin Fehn, both of Emmerting; Christof Wörner, Burghausen, all of (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 09/514,027

(22) Filed: Feb. 25, 2000

(30) Foreign Application Priority Data

Mar. 3, 1999 (DE) .............................. 199 09 338

(51) Int. Cl.$^7$ ...................................... C08J 3/20
(52) U.S. Cl. .................. 523/343; 524/588; 524/492; 524/445; 524/449; 524/425; 524/448; 264/176.1; 264/37.26; 366/279; 366/301; 366/79; 366/83; 528/214; 523/351
(58) Field of Search .................................. 524/588, 492, 524/445, 449, 425, 448; 264/176.1, 37.26; 366/279, 301, 79, 83; 528/24; 523/343, 351

(56) References Cited

U.S. PATENT DOCUMENTS 3,745,200 * 7/1973 Geyer.

FOREIGN PATENT DOCUMENTS

| 0 258 159 A1 | 3/1988 | (EP). |
| 0 849 331 A2 | 6/1998 | (EP). |
| 0 909 777 A2 | 4/1999 | (EP). |
| WO92/13694 | 8/1992 | (WO). |

OTHER PUBLICATIONS

Derwent Abstract Corresponding To EP 0 258 159 AN [1988—058322].
Derwent Abstract Corresponding To WO 92/13694 AN [1992—277301].
International Search Report—Apr. 14, 2000.
Derwent Abstract corresponding to WO 92/13694 (AN 1992–277301).
Derwent Abstract corresponding to EP 0 849 331 (An 1998–324644).

* cited by examiner

Primary Examiner—Robert Dawson
Assistant Examiner—Kuo-Liang Peng
(74) Attorney, Agent, or Firm—Brooks & Kushman P.C.

(57) ABSTRACT

In a continuous process for producing filler-containing silicone compositions (P), a silicone composition (E) comprising filler (F1) is mixed with filler (F2).

19 Claims, 1 Drawing Sheet

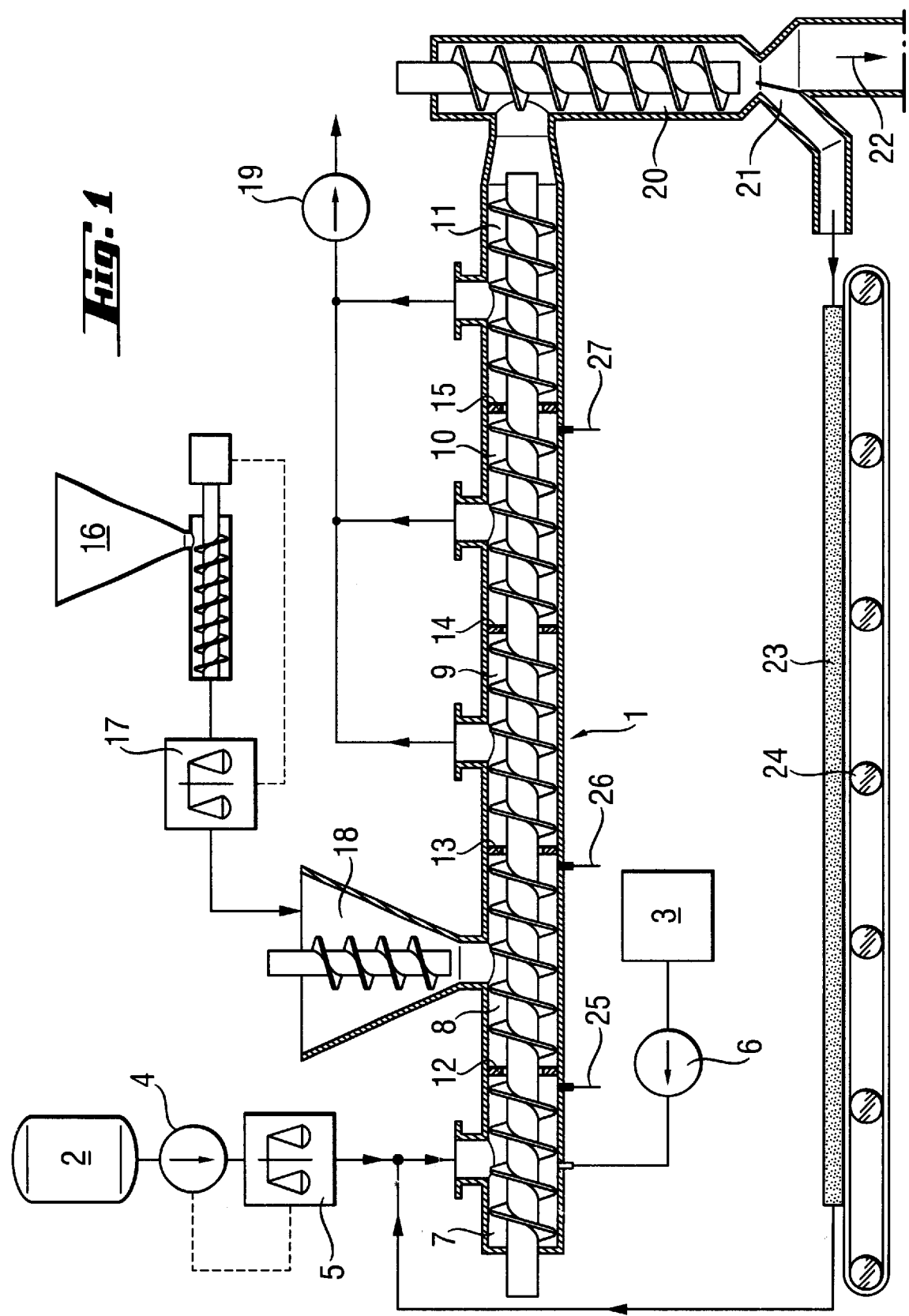

PROCESS FOR THE CONTINUOUS PRODUCTION OF HIGHLY VISCOUS FILLER-CONTAINING SILICONE COMPOSITIONS

TECHNICAL FIELD

The invention relates to a continuous process for producing highly viscous, filler-containing silicone compositions.

BACKGROUND ART

The production of filler-containing silicone compositions, i.e. the production of liquid-phase homogeneous compositions which are composed essentially of finely divided solids and polyorganosiloxanes, is an important process which is widely used. For example, crosslinkable silicone elastomer compositions such as the compositions known to those skilled in the art under the designations HTV, LSR, RTV-2 and RTV-1, silicone master batches, silicone pastes, etc., are all produced by such a process.

Continuous and discontinuous (batchwise) processes for producing filler-containing silicone compositions are considered distinct processes by those skilled in the art. In batch processes, all constituents of the filler-containing silicone composition are, in a first step, introduced into a mixing apparatus, e.g. a mechanical mixer, if desired in portions, and then mixed with one another. The finished silicone composition is subsequently, in a second step, removed from the mixing apparatus before the mixing apparatus is again charged with starting materials for a further batch.

In continuous processes, the starting materials, in the ratio corresponding to the formulation desired, are fed continuously into a mixing apparatus, e.g. a reciprocating kneader, mixed and if appropriate, degassed, and the finished silicone composition is simultaneously removed continuously from the mixing apparatus, as a result of which a dynamic equilibrium between starting materials introduced and silicone composition discharged is established. Such a process for the continuous production of HTV silicone compositions is described, for example, in EP-A-570387.

Continuous processes for producing filler-containing silicone compositions represent a tremendous step forward compared to the batch processes in respect of economics (significantly higher space-time yields) and product quality (lower fluctuations).

In the production of silicone compositions which have a high content of actively reinforcing fillers, there is a fundamental difficulty of dispersing relatively high proportions of a finely divided solid in liquid polyorganosiloxane. Due to the high specific surface area of actively reinforcing fillers and the associated strong interaction between filler and polyorganosiloxane, phase inversion (crumbling) occurs rather easily. Phase inversion, in this sense, means a disintegration of the previously compact, liquid polyorganosiloxane phase into a pulverulent, solid-phase material. The further processing of the pulverulent composition to give a compact, homogeneous, liquid-phase silicone composition requires phase reinversion (compacting) which is difficult to bring about, and results in numerous disadvantages.

To achieve compacting of the pulverulent composition, the mixing apparatus has to be configured such that the pulverulent composition is banked up and compacted to an extreme degree in order to be able to introduce sufficient shear energy to achieve compacting. In terms of the apparatus structure, this can be done by installing constricting rings which reduce the cross section of the (tubular) mixing apparatus. The high compacting pressure to which the pulverulent composition needs to be subjected, and the simultaneous shear, are both associated with very high dry friction between the particles of the pulverulent composition. This results in mechanical destruction of the high molecular weight polyorganosiloxanes, which causes an adverse change in the final properties of the finished products produced from these silicone compositions. In particular, it is found that highly filled HTV in particular silicone compositions whose continuous production has involved a phase inversion display a greater tendency to undergo crepe hardening and to become brittle during storage than do HTV silicone compositions which are made up of the same constituents but have been produced batchwise and without phase inversion, e.g. in a kneader.

The intensive shear under high compacting pressure also leads to increased equipment wear, as a result of which abraded metal contaminates the silicone composition.

The difficulty of compacting pulverulent silicone compositions in continuous mixing apparatuses is also shown by the fact that even pressing the composition under high pressure with the simultaneous application of shear sometimes compacts the compositions only incompletely, so that when the pressing pressure is released while continuing to apply shear, non-cohesive silicone composition particles are formed again. The formation of a stable, compact, liquid-phase silicone composition therefore frequently occurs only after a plurality of compaction steps. This also means that actual kneading in the sense of a laminar and dispersive mixing processes only occurs in the downstream part of the mixing apparatus, shortly before discharge of the composition; the operating window of the process is considerably narrowed thereby, i.e. slight changes in the apparatus, raw materials, process parameters (throughput, temperature, vacuum, etc.) can result in serious changes in the product quality.

All known continuous processes for producing highly filled, highly viscous silicone compositions such as HTV silicone compositions suffer from these disadvantages. In general, the problems associated with phase inversion are all increasingly more serious with higher filler content, higher specific surface area of the filler, and increased filler-polyorganosiloxane interaction.

EP-A-849 331 describes a process for producing highly filled silicone polymer/solid premixes which avoids the disintegration of the silicone composition during mixing, by addition of volatile, low molecular weight organosilicon compounds which have no hydrolyzable groups. After the incorporation of the solid, the low molecular weight organosilicon compounds are removed again. This process is not very suitable for the continuous production of highly filled silicone compositions since the low molecular weight organosilicon compounds have to be mixed into the polyorganosiloxane in a very large amount to prevent phase inversion; in addition, the subsequent removal of large amounts of low molecular weight organosilicon compounds is costly and presents safety problems.

DISCLOSURE OF INVENTION

It is an object of the invention to provide a continuous process for producing storage-stable filler-containing silicone compositions which is simple to carry out. This and other objects are achieved by the subject invention process. The subject invention provides a continuous process for producing filler-containing silicone compositions (P) in which a silicone composition (E) comprising filler (F1) is mixed with filler (F2).

BRIEF DESCRIPTION OF DRAWINGS

FIG. 1 illustrates an apparatus suitable for use in one embodiment of the present invention.

BEST MODE FOR CARRYING OUT THE INVENTION

The process of the invention makes it possible to continuously produce highly filled silicone compositions (P), e.g. HTV silicone rubber compositions without occurrence of phase inversion by a process which, unlike the procedure in conventional processes, does not involve adding filler to the (filler-free) polyorganosiloxane and thereafter mixing it in; but instead involves metering the filler continuously into a silicone composition (E) which already contains filler and thereafter mixing the components.

In particular, the process of the invention has the following advantages:

Compacting according to conventional processes is either time-consuming or makes a specific design of the mixing apparatus necessary, e.g. in order to be able to repeatedly bank up the composition under a high compacting pressure. The process of the invention makes possible more rapid compacting and makes fewer demands on the design of the mixing apparatus.

No dry friction occurs during mixing, as a result of which material wear in the mixing apparatus is reduced.

The drawing-in and mixing-in of the filler (F2) occurs significantly more quickly than when using a conventional polyorganosiloxane feed.

The mechanical destruction of the polyorganosiloxane which is associated with dry friction in conventional processes is avoided.

The silicone compositions (P) produced by the process of the invention have better storage stability; in particular, crepe hardening and brittleness are avoided.

The process of the invention makes it possible to obtain a higher dispersion quality of the finely divided filler (F2), since no dry friction occurs in the mixing apparatus but instead the high shear stresses associated with a kneading process result in intensive laminar and dispersive mixing.

The length of tubular, continuously operating mixing apparatuses can be substantially reduced since the silicone composition, which is compact at all times, is subjected to an intensive kneading process over the entire length of the mixing apparatus.

The process of the invention makes it possible to produce silicone compositions (P) which could hitherto be produced only batchwise in a kneader and are not available for continuous production, since in the process of the invention the shear conditions prevailing in the kneader can be adjusted significantly better.

Since a compact phase whose surface is continually being renewed as a result of kneading is always present in the process of the invention, significantly more favorable conditions for the careful removal of volatile constituents, in particular degassing under vacuum, are provided.

Owing to the better miscibility of the polyorganosiloxane or the filler (F2) with the silicone composition (E), the addition of dispersants etc. can be reduced to a minimum.

The silicone composition (E) already containing filler (F1) can be produced separately. If the silicone composition (E) functioning as starting material in this case already has the composition of the silicone composition (P) to be produced, the remaining starting materials, i.e. polyorganosiloxane and filler (F2), can be metered in in the ratio corresponding to the formulation.

If, on the other hand, the composition of the silicone composition (E) functioning as starting material differs from that of the desired silicone composition (P), this can be taken into account by appropriate metering-in of polyorganosiloxane and/or filler (F2), so that in this case, too, a silicone composition (P) of given composition can be produced.

For example, the process of the invention can serve merely to increase, in a continuous mixing apparatus, the filler content of a silicone composition (E) which already contains filler and has been produced, if desired, in another mixing apparatus. In this case, it would of course be unnecessary to mix in additional polyorganosiloxane.

The process of the present invention is preferably carried out with part of the silicone composition (P) discharged being recirculated as silicone composition (E) to the front part of the mixing apparatus, so that the remaining starting materials, which comprise polyorganosiloxane and filler (F2), can be metered in in the ratio corresponding to the recipe and be mixed into this recirculated stream. This preferred embodiment of the process is basically a circulation process in which the preferably major portion of the finished silicone composition (P) is discharged and the remaining and preferably smaller portion of the finished silicone composition (P) is recirculated as silicone composition (E) to the continuous mixing apparatus in order to suppress phase inversion. The recirculation of silicone composition (P) can be carried out, for example, in the form of a liquid, as continuous extrudate, pellets or granules.

The recirculation results, in particular, in the following advantages:

The quality of the silicone composition (P) is subject to smaller variations because fluctuations, e.g. in the metering of filler, are evened out.

The process of the invention makes it possible to change, in particular to increase, the effective residence time at will by increasing the ratio of recirculated to discharged silicone composition (P), so that even silicone compositions (P) which need to meet extremely high demands in terms of dispersion quality of the filler can be produced.

The process of the invention guarantees that it is possible to produce ultra highly filled silicone compositions (P). Firstly, complete recirculation enables the filler content of the silicone composition (P) to be effectively increased steplessly. Second, the ratio of recirculated to discharged silicone composition (P) can be set to any desired value, so that a batchlike procedure becomes possible when all of the silicone composition (P) discharged is recirculated.

The order of the metered addition of the polyorganosiloxane and filler (F2) to the silicone composition (E) is not fixed. In a preferred embodiment, the polyorganosiloxane is first mixed into the silicone composition (E) and the filler (F2) is subsequently mixed in, since this particularly effectively counters the risk of disintegration of the compact silicone composition to a pulverulent material. It can also be more advantageous to mix in the filler (F2) first in order to obtain a particularly highly viscous composition, which can be advantageous in respect of the dispersion quality of the filler particles owing to the high shear stresses which occur, and only subsequently to carry out a back-dilution by metering in the polyorganosiloxane. Polyorganosiloxane and filler (F2) as well as any further additives can also be metered in and effectively mixed in simultaneously.

Preference is given to recirculating only that amount of silicone composition (P) which reliably avoids phase inversion and does not unnecessarily reduce the space-time yield of the continuously operating mixing apparatus. Preferably, for 100 parts by weight of silicone composition (P) discharged in steady-state operation, from 1 to 99 parts by weight are recirculated as silicone composition (E), preferably from 5 to 50 parts by weight, particularly preferably from 10 to 30 parts by weight.

Since the mixing process is configured very differently depending on chemical composition and, in particular, viscosity of the polyorganosiloxane and also on the type and amount used of the filler, numerous processes and mixing tools have been developed to ensure optimum mixing.

Mixing tools which can be used for producing silicone compositions (E) comprising filler (F1) are, for example, stirring machines, sigma kneaders, plunger kneaders, internal mixers, single-screw extruders, twin-screw extruders, oscillating reciprocating kneaders, dissolvers, mixing turbines, press mixers and mixing rolls in a variety of designs. The process of the invention is preferably carried out in a continuous mixing apparatus, e.g. a reciprocating kneader or a single- or twin-screw extruder. There, the entire composition is increasingly removed from the metering unit during the mixing process.

Mixing of the filler (F2) and any further starting materials with the filled silicone composition (E) is preferably carried out at a temperature of from −40° C. to +300° C. If no thermolabile starting materials are to be mixed in, preference is given to carrying out the mixing process at elevated temperature at from 50° C. to 250° C., in particular from 150° C. to 230° C. Owing to the heat of friction, to the metered addition of the starting materials, and to the restrictions imposed on uniformly heating the continuous mixing apparatus, a temperature profile is generally established along the mixing section. Relatively high temperature differences are quite possible along the mixing section.

Mixing of the starting materials with the silicone composition (E) can be carried out at atmospheric pressure, additional pressure or reduced pressure. Preference is given to applying a vacuum to the mixing apparatus in order to remove volatile constituents from the composition (degassing) and/or to aid the metered addition of constituents of the composition. Preference is given to pressures of not more than 950 mbar, particularly preferably from 900 to 1 mbar. In terms of the pressure also, a profile is generally established within the mixing apparatus. If desired, an inert gas (nitrogen, argon) can be employed, for example to meet safety requirements. Moreover, a gas stream (air, nitrogen, argon, etc.) can be deliberately introduced to enable volatile constituents to be removed more readily (entrainment gas).

The filler content of the silicone composition (E) in the process variant without recirculation of the silicone composition (P) is from 5 to 80% by weight, preferably from 10 to 50% by weight. Particular preference is given to using silicone compositions (E) having a filler content of from 20 to 40% by weight.

The filler content of the silicone composition (E) in the process variant which involves recirculation of the silicone composition (P) is from 5 to 90% by weight, preferably from 10 to 50% by weight. Particular preference is given to using silicone compositions (E) having a filler content of from 20 to 40% by weight.

Possible fillers (F1, F2) are all fillers customarily used in silicone compositions, with mixtures of various fillers also being able to be used and the fillers (F1) and (F2) optionally being different, as well. Examples of suitable fillers (F1, F2) are silicas, carbon black, metal oxides, metal carbonates, metal sulfates, metal nitrides, diatomaceous earth, clays, chalks, mica, metal powder, activated carbon, powders of organic polymers, etc. It is important that the viscosity of the filler-containing silicone composition is, due to the filler content, significantly higher than the viscosity of the polyorganosiloxane which is to be continuously mixed into this filler-containing silicone composition. Preference is given to reinforcing fillers, i.e. filters having a specific surface area measured by the BET method of at least 50 m²/g, preferably 50–500 m²/g, for example pyrogenic silica, silica hydrogels which have been dehydrated with retention of the structure, i.e. aerogels, other types of precipitated silicon dioxide and carbon blacks. The particularly preferred pyrogenic silicas, precipitated silicas and carbon blacks can, if desired, have been subjected to a surface treatment, for example to improve their dispersibility. It is also possible for the silicone resins of the $M_W D_X T_Y Q_Z$ type which are solid at room temperature, when in pure form, to be processed as a filler material.

The polyorganosiloxanes on which the silicone composition (E) is based and which are mixed in in the process of the invention can be a single polyorganosiloxane or a mixture of different polyorganosiloxanes. Essentially, all previously described polyorganosiloxanes which are well known to those skilled in the art for the production of HTV, LSR, RTV-1 and RTV-2 compositions can be employed. These include linear, branched, cyclic or resin-like polyorganosiloxanes which may, usually for the purpose of crosslinkability, contain functional groups. Preference is given to using linear polyorganosiloxanes such as polydimethylsiloxanes having a degree of polymerization of from 50 to 9000. Preferred organic radicals in the polyorganosiloxanes are methyl, phenyl and trifluoropropyl, particularly preferably methyl. The functional groups which are preferably present in the polyorganosiloxanes are —SiOH, —SiOR, Si-vinyl and —SiH, particularly preferably Si-vinyl. Particularly preferred polyorganosiloxanes are the polyorganosiloxanes which are customarily used for producing HTV silicone compositions and have a Brabender value of from 200 to 900 daN·m measured at 25° C., in particular from 400 to 700 daN·m.

The composition of the polyorganosiloxanes preferably corresponds to the average general formula (1)

$$R^1_a R^2_b SiO_{(4-a-b)/2} \tag{1}$$

where the radicals $R^1$ are identical or different, monovalent Si-bonded radicals selected from among —H, —OH, —OR where R is a $C_1$–$C_{10}$-hydrocarbon radical, and unsubstituted, halogen-substituted or cyano-substituted $C_1$–$C_{10}$-hydrocarbon radicals which are bound to silicon via a divalent organic group and have at least one aliphatic carbon-carbon multiple bond, and $R^2$ are identical or different, monovalent Si-bonded, unsubstituted, halogen-substituted or cyano-substituted $C_1$–$C_{10}$-hydrocarbon radicals which contain no aliphatic carbon-carbon multiple bonds.

a is from 0 to 1, and b is from 1 to 2.1.

$R^1$ is preferably an alkenyl group which is able to react with an SiH-functional crosslinker or with a peroxide. Use is usually made of alkenyl groups having from 2 to 6 carbon atoms, e.g. vinyl, allyl, methallyl, 1-propenyl, 5-hexenyl, ethynyl, butadienyl, hexadienyl, cyclopentenyl, cyclopentadienyl, cyclohexenyl, preferably vinyl and allyl.

Divalent organic groups via which the alkenyl groups may be bound to silicon of the polymer chain comprise, for example, oxyalkylene units such as those of the general formula (2)

$$-(O)_p[(CH_2)_qO]_r- \quad (2),$$

where
- p is 0 or 1, in particular 0,
- q is from 1 to 4, in particular 1 or 2 and
- r is from 1 to 20, in particular from 1 to 5.

The oxyalkylene units of the general formula (2) are bound at left in the formula above, to a silicon atom.

The radicals $R^1$ can be bound in any position in the polymer chain, in particular at the terminal silicon atoms.

$R^2$ preferably has from 1 to 6 carbon atoms. Particular preference is given to methyl and phenyl.

The structure of the polyorganosiloxanes of the general formula (1) can be linear, cyclic or branched. The content of trifunctional and/or tetrafunctional units, which lead to branched polyorganosiloxanes, is typically very low, preferably not more than 20 mol %, in particular not more than 0.1 mol %.

Particular preference is given to using polydimethylsiloxanes which contain vinyl groups and whose molecules correspond to the general formula (3)

$$(ViMe_2SiO_{1/2})_c(ViMeSiO)_d(Me_2SiO)_e(Me_3SiO_{1/2})_f \quad (3)$$

where the non-negative integers c, d, e and f fulfill the following relationships: $c+d \geq 1$, $c+f=2$, $1000<(d+e)\geq 9000$, preferably $3000<(d+e)<7000$, and $0<(d+1)/(d+e)<1$, preferably $0<(d+1)/(d+e)<0.1$.

The silicone compositions (E) and (P) may further comprise other additives which serve to give specific properties, in particular processing aids such as plasticizers, for example silanol-containing oligosiloxanes, trimethylsilyl end blocked dimethyl(oligo or poly)siloxanes; surfactants; dispersants; hydrophobicizing agents, for example silazanes, silanol-containing oligosiloxanes; destructuring agents; emollients; and also dyes and pigments; inhibitors; accelerators; catalysts, for example Pt-containing hydrosilylation catalysts; crosslinkers, for example SiH containing siloxanes; peroxides; bonding agents; heat stabilizers; antioxidants, etc. Particularly preferred additives are the hydrophobicizing agents which aid the incorporation of hydrophilic fillers (F2) such as hydrophilic pyrogenic or precipitated silica. Examples of such hydrophobicizing additives are silanol-containing oligosiloxanes and organodisilazanes, as well as trimethylsilyl-terminated oligodimethylsiloxanes.

The starting materials, namely the fillers (F2), polyorganosiloxanes and additives, can be metered and mixed into the silicone composition (E) in any order; the introduction of, for example, the filler(s) can also be carried out at one or more point(s) in the mixing apparatus. The polyorganosiloxanes are preferably metered in at one point.

The silicone compositions (P) produced by the process of the invention are preferably relatively high-viscosity silicone compositions having a viscosity measured at 25° C. of at least 500 Pa·s. The process of the invention is particularly suitable for producing relatively high-viscosity silicone compositions (P) having a Brabender plasticity measured at 25° C. of from 100 to 1000 daN·m, and also very high-viscosity compositions having a viscosity measured by the Mooney method of from 10 to 200 Mooney units (final Mooney value, ML (1+4), 23° C., DIN 53523).

The process of the invention is particularly suitable for producing highly filled, highly viscous silicone compositions such as HTV compositions, high-viscosity silicone pastes and highly filled silicone master batches. The HTV compositions can also be base mixtures which are employed for producing finished, crosslinkable HTV compositions. The HTV compositions produced can be, for example, HTV compositions which are crosslinked peroxidically, by means of a Pt-catalyzed addition reaction or a condensation reaction or by high-energy radiation.

In the following examples, unless otherwise indicated,
a) all pressures are 0.10 MPa (abs.);
b) all temperatures are 20° C.

EXAMPLES

Description of the Experimental Facility with Reference to FIG. 1

The experiments were carried out using an LR 100/19D type compounder from Buss Compounding Systems AG.

In the first 3D of the compounder (1), the polymer (2) and plasticizer (3) are metered in. Suitable devices for metering in the polymer are gear pumps or metering screws, in general conveying devices which can readily take up the poorly flowing polymer on the intake side and are also capable of building up the relatively high pressures required to convey the material. In a specific case, a heatable gear pump (4) is used and gravimetric metering is carried out with the aid of a differential metering balance (5). For metering in the plasticizer, use is likewise made of a gear pump (6), this time combined with a mass flowmeter. The metering of liquid, low-viscosity components is not critical and can also be carried out by means of other types of pumps, coupled with a method of detecting the volume or mass flow.

The compounder (1) is divided into 5 zones, viz. the barrel sections (7), (8), (9), (10) and (11), (3D/4D/4D/4D/4D), which are each separated from one another by constricting rings (12), (13), (14) and (15). In the second section (8), finely divided silica (FDS) (16) is likewise fed into the compounder (1) with the aid of a differential metering balance (17) via an inlet screw (ELS) (18). In principle, it is also possible to use other metering systems, e.g. side feeders. In addition, mention may be made of the possibility of gravimetric metering with the aid of membrane pumps.

The 3rd to 5th sections, viz. (9), (10) and (11), serve as kneading and degassing zone. A vacuum generated by means of a liquid ring pump (19) is applied. Rotary piston pumps or ejector pumps are also suitable.

The product is discharged from the compounder by means of a short downstream discharge screw (20) or a gear pump. On the pressure side, a slit die (21) which is divided by a welded-in web is installed upstream of the discharge device so that the product (22) is discharged in the form of two strips having a mass ratio of about 1:3. In principle, the stream can also be divided by means of appropriate extruder dies or using throttle devices in a branch downstream of the extruder. The recirculation of the silicone rubber composition (23) to be fed into the first section (7) of the compounder is carried out by means of a conveyor belt (24). A single- or twin-screw extruder or a gear pump could be advantageously used for reintroduction of the recirculated silicone rubber composition. The compounder is provided with three temperature measurement points (25), (26) and (27).

Formulation Used

The examples which demonstrate the process of the invention and also the comparative examples were based on a silicone rubber composition made up of the following:

HTV solid polymer:

100 parts by weight of an HTV solid polymer which has a viscosity of about 20,000 Pa·s at a temperature of 25° C. and a shear rate of 0.81 s$^{-1}$ and, according to the $^1$H—NMR spectrum, has the following number-average composition:

Vi—Si(Me)$_2$—[OSi(Me)$_2$]$_m$—[OSiMeVi]$_n$—OSi(Me)$_2$—Vi where Me denotes a methyl radical and Vi denotes a vinyl radical, n+m is about 6000 and m/n is about 3000.

Plasticizer:

16.7 parts by weight of a plasticizer which, according to the $^{29}$Si—NMR spectrum, has the following number-average composition:

HO—Si(Me)$_2$—[OSi(Me)$_2$]$_m$—OSi(Me)$_2$—OH, where m is about 14 and the viscosity measured at a temperature of 25° C. is 41 mm$^2$/S.

Silica:

50 parts by weight of a pyrogenic silica obtainable under the name Wacker HDK® T30 and having a specific surface area measured by the BET method of 300 m$^2$/g.

Example 1

In this Example, an Example according to the subject invention, a finished silicone rubber composition was co-fed with recirculation. Using the facilities shown in F1G. 1, 30 kg/h of the solid polymer and 5 kg/h of the plasticizer were fed into section (7) of the compounder. In section (8), 15 kg/h of FDS were metered in. The temperature of the silicone rubber composition at a screw rotation rate of 180 rpm was adjusted by heating/cooling the shaft and the individual sections of the barrel so that the temperatures measured at the measurement points (25), (26) and (27) were about 150° C./200° C./180° C. The product stream downstream of the discharge screw was divided by means of a slit die (21) provided with a web, with 50 kg/h being discharged as unsieved silicone rubber composition (22) (=sample 1) and the remaining 16 kg/h (23) were returned to section (7) of the compounder by means of the conveyor belt (24).

Example 2

In this Example, also a subject invention example, a finished silicone rubber composition was co-fed without recirculation. About 16 kg/h of a finished silicone rubber composition corresponding to the above-described formulation were metered pseudocontinuously in the form of rubber strips into section 1 of the compounder. Polymer and plasticizer metering were carried out as described under Example 1. The resulting mass flow of the silicone rubber composition discharged was 66 kg/h (=sample 2). A temperature profile comparable to that in the preceding experiment can be set by additional heating of zone 1 (7).

Example 3

In this comparative example, not according to the invention, neither recirculation nor other additional introduction of silicone rubber composition into section 1 was carried out. The compounder was supplied with amounts of starting materials (HTV solid polymer, plasticizer, silica) corresponding to the formulation so that a throughput of 50 kg/h resulted (=sample 3). A temperature profile comparable to the Examples 1 and 2 according to the invention was set by means of appropriate heating/cooling of the barrel wall and shaft.

Example 4

In this example, also not according to the invention, neither recirculation nor other additional introduction of silicone rubber composition into section 1 was carried out. In order to simulate a degree of fill of the compounder comparable to that in the Examples 1 and 2 according to the invention, the constricting rings (13), (14) and (15) were made narrower. As maximum possible throughput, about 45 kg/h of silicone rubber composition were able to be produced. In this experiment too, the product temperatures were made comparable by heating/cooling (=sample 4).

Example 5

In this Comparative Example, like those of Examples 3 and 4, neither recirculation nor other additional introduction of silicone rubber composition into section 1 was carried out. An attempt was made to increase the throughput to 66 kg/h under the conditions described in Example 3. This failed because the silica could no longer be taken up by the solid polymer/plasticizer mixture at a throughput only slightly above 50 kg/h (no sample).

TABLE 1

Visual assessment of the silicone rubber composition in the opened compounder after an emergency stop

| Sample | Zone 1 | Zone 2 | Zone 3 | Zone 4 | Zone 5 |
|---|---|---|---|---|---|
| 1 | soft rubber composition | nodule-like, largely cohesive rubber composition | transparent, plastic, compact silicone rubber composition | | |
| 2 | soft rubber composition | nodule-like, largely cohesive rubber composition | transparent, plastic, compact silicone rubber composition | | |
| 3 | Polymer/plasticizer mixture | dry, pulverulent mixture | milky, relatively crumbly rubber composition | almost transparent rubber composition | transparent, plastic rubber composition |
| 4 | Polymer/plasticizer mixture | dry, pulverulent mixture | milky, relatively crumbly rubber composition | transparent, plastic, compact silicone rubber composition | |

The degree of fill of the compounder in zones 3 and 4 for the samples 1 and 2 correspond to that for sample 4; in the case of sample 3, a lower degree of fill is found.

Testing of the Silicone Rubber Compositions Produced

In all experiments, the samples of silicone rubber compositions produced were cooled to room temperature by being allowed to stand and were wrapped in PE films. The viscosity of the silicone rubber sample, measured in Mooney units, was determined as a function of the storage time. In addition, the behavior of a test specimen of the rubber composition was evaluated qualitatively on a roll mill.

TABLE 2

Dependence of the Mooney viscosity of the samples on the storage time

| Storage time at RT | Sample 1 | | | Sample 2 | | | Sample 3 | | | Sample 4 | | |
|---|---|---|---|---|---|---|---|---|---|---|---|---|
| | A | B | C | A | B | C | A | B | C | A | B | C |
| 1 day | 67 | 57 | 10 | 70 | 59 | 11 | 68 | 60 | 08 | 65 | 55 | 10 |
| 1 week | 70 | 57 | 13 | 73 | 59 | 14 | 80 | 60 | 20 | 76 | 55 | 21 |
| 2 weeks | 72 | 57 | 15 | 74 | 59 | 15 | 83 | 59 | 24 | 78 | 54 | 24 |
| 1 month | 73 | 57 | 16 | 74 | 59 | 15 | 87 | 57 | 30 | 83 | 53 | 30 |
| 2 months | 73 | 57 | 16 | 76 | 59 | 17 | 91 | 56 | 37 | 88 | 52 | 36 |
| 3 months | 74 | 57 | 17 | 77 | 59 | 18 | not measurable; samples crumble | | | | | |
| 6 months | 75 | 56 | 19 | 78 | 58 | 20 | not measurable; samples crumble | | | | | |

The Mooney values (ML1 + 4) reported in Table 2 have the following meanings: A = initial Mooney value, B = final Mooney value and C = difference between initial value and final value (DIN 53523).

Behavior on the Roll Mill

Samples 1 and 2:
Good intake behavior even after a storage time of 6 months; relatively dry feel; no sticking to the rolls.

Samples 3 and 4:
Good intake behavior up to a storage time of about 2 months. After longer storage, the samples crumble in the gap between the rolls. The plastic rubber sticks somewhat to the rolls. The processing behavior of sample 4 is somewhat better than that of sample 3.

Conclusion

The samples 1 and 2 produced by the process of the invention have significantly better storage stability; they also have a dry feel and better milling behavior.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A continuous process for producing filler-containing silicone product compositions in which a silicone composition (E) comprising one or more organopolysiloxanes and filler is mixed with additional filler in a mixing device, and said filler-containing silicone product composition (P) continuously exits said mixer, said process comprising:

dividing said filler-containing silicone product composition (P) into two or more portions, at least one of said two or more portions being a recycle stream (P');
introducing said recycle stream (P') into said mixer as at least a portion of said silicone composition (E);
introducing additional filler; and
introducing additional organopolysiloxane into said mixer, whereby said silicone product composition (P) has a higher filler content than the filler content of said silicone composition (E).

2. The process as claimed in claim 1, wherein the portion of the silicone product composition (P) which is recirculated as recycle stream (P') is from 5 to 50 weight percent of the silicone product composition (P).

3. The process as claimed in claim 1, wherein first organopolysiloxane, and subsequently additional filler are mixed into the silicone composition (E).

4. The process as claimed in claim 2, wherein first organopolysiloxane, and subsequently additional filler are mixed into the silicone composition (E).

5. The process as claimed in claim 1, wherein the mixing process is carried out at from 50° C. to 250° C.

6. The process as claimed in claim 2, wherein the mixing process is carried out at from 50° C. to 250° C.

7. The process as claimed in claim 1, wherein the silicone compositions (P) have a viscosity measured at 25° C. of at least 500 Pa·s.

8. The process as claimed in claim 2, wherein the silicone compositions (P) have a viscosity measured at 25° C. of at least 500 Pa·s.

9. The process of claim 1, wherein the silicone composition (P) has a Brabender plasticity measured at 25° C. of 100 daN·m or greater.

10. The process of claim 2, wherein the silicone composition (p) has a Brabender plasticity measured at 25° C. of 100 daN·m or greater.

11. The process of claim 1, wherein the silicone composition (P) has a Mooney viscosity of from 10 to 200 Mooney units at 23° C.

12. The process of claim 2, wherein the silicone composition (P) has a Mooney viscosity of from 10 to 200 Mooney units at 23° C.

13. The process of claim 1, wherein the filler content of silicone composition (P) is from 20 to 40% by weight based on the total weight of the composition.

14. The process of claim 2, wherein the filler content of silicone composition (P) is from 20 to 40% by weight based on the total weight of the composition.

15. The process of claim 1, wherein the filler content of silicone product composition (P) is 20 to 40% by weight based on the weight of (P), and the filler content of silicone composition (P) is greater than the filler content of silicone composition (E) prior to addition of said additional filler.

16. The process of claim 2, wherein the filler content of silicone product composition (P) is 20 to 40% by weight based on the weight of (P), and the filler content of silicone product composition (P) is greater than the filler content of silicone composition (E) prior to addition of said additional filler.

17. The process as claimed in claim 1, wherein the silicone compositions (P) are finished HTV compositions or base mixtures employed for producing finished, crosslinkable HTV compositions.

18. The process as claimed in claim 2, wherein the silicone compositions (P) are finished HTV compositions or base mixtures employed for producing finished, crosslinkable HTV compositions.

19. The process of claim 1, wherein said recycle stream (P') is from 10 to 30 weight percent of said silicone product composition (P), and said silicone product composition (P) contains from 20 to 40 weight percent, based on the weight of said silicone product composition (P), of at least one reinforcing filler.

* * * * *